United States Patent [19]
Hughes et al.

[11] 4,184,767
[45] Jan. 22, 1980

[54] FREQUENCY AGILE OPTICAL RADAR

[75] Inventors: Richard S. Hughes; Keith L. Gardner, both of China Lake, Calif.

[73] Assignee: The United States of America as represented by the Secretary of the Navy, Washington, D.C.

[21] Appl. No.: 601,237

[22] Filed: Jul. 21, 1975

[51] Int. Cl.$^2$ .............................................. G01B 11/26
[52] U.S. Cl. ..................................... 356/152; 250/225; 250/226; 356/5; 356/141; 356/327; 356/402
[58] Field of Search ................... 356/141, 152, 74, 96, 356/116, 327, 402; 250/226, 225

[56] References Cited
U.S. PATENT DOCUMENTS

| | | | |
|---|---|---|---|
| 3,316,412 | 4/1967 | Hirschberg | 250/226 |
| 3,484,167 | 12/1969 | Burns, Jr. | 356/5 |
| 3,541,503 | 11/1970 | Stiles | 340/27 NA |
| 3,612,659 | 10/1971 | Forward | 350/162 R |
| 3,846,026 | 11/1974 | Waters | 356/141 |

OTHER PUBLICATIONS

Caristi et al., Image Technology, 4-5 1972, pp. 19-22, Vol. 14, #3.

Primary Examiner—S. C. Buczinski
Attorney, Agent, or Firm—R. S. Sciascia; W. Thom Skeer; Roy Miller

[57] ABSTRACT

A frequency agile optical radar system including a frequency agile laser source coupled with an extra-cavity dispersive element in such a manner as to radiate into space specific optical frequencies correlated with specific elevation angles measured from the horizontal. Laser radiation reflected from an object in space is detected by a staring detector system and the wavelength of the reflected optical energy determined therefrom. The elevation angle of the object in space is correlated with the optical frequency determination and coupled together with target range and azimuth angle so that the position and range to an object in space may be determined.

8 Claims, 6 Drawing Figures

FREQUENCY AGILE OPTICAL RADAR

CROSS-REFERENCE TO RELATED APPLICATIONS

U.S. patent application Ser. No. 287,112, filed Sept. 1, 1972, "Laser Scanner" by Richard S. Hughes and Walter B. LaBerge, now abandoned.

U.S. patent application Ser. No. 375,243, filed June 25, 1973, "Laser Radiation Sensor" by Paul C. Driver, Keith L. Gardner and Donald W. Peterson.

BACKGROUND OF THE INVENTION

1. Field of the Invention

The present invention is concerned with the field of optical radar systems.

SUMMARY OF THE INVENTION

The present invention is directed to a unique laser radar system realized by combining a frequency agile source of coherent radiation with a staring detector system, i.e., a detector system that is continously sensitive to a wide spectral bandwidth from a given volume in space. Various techniques for providing a frequency agile laser and a staring detector system are possible, however, the present application will be directed to a specific technique for producing the system. The details of the frequency agile laser source are set forth in copending U.S. patent application 287,112 and the details of the staring detector system are set forth in co-pending U.S. patent application 375,243.

Basically, a frequency agile laser source is coupled with an extracavity dispersive element in such a manner as to radiate into space specified optical frequencies associated with specific elevation angles. The angles are measured from the sensed horizontal. Laser radiation that is reflected from some object (target) in space is detected by a staring detector system and the optical frequency (wavelength) of the reflected optical energy is determined. Determining the optical frequency determines the elevation angle of the object in space. When this information is coupled with target range, as determined by the laser range finding function, and the azimuth angle, as determined by a digital shaft encoder, etc., associated with the system, the position in space of the object or target is determined.

DESCRIPTION OF THE PREFERRED EMBODIMENT

One of the unique and very important features of the system to be described hereafter is that the elevation angle is determined with no moving components. This is provided for by the characteristics of the laser source and laser radiation detection system as set forth in the co-pending U.S. patent application Ser. Nos. 287,112 and 375,243 respectively. Essentially, a system is provided which scans in elevation without physical movement in that plane. The only movement necessary is the scan about the vertical, i.e., the azimuthal scan. In addition, the system inherently has high accuracy and reliability.

Figure 1:
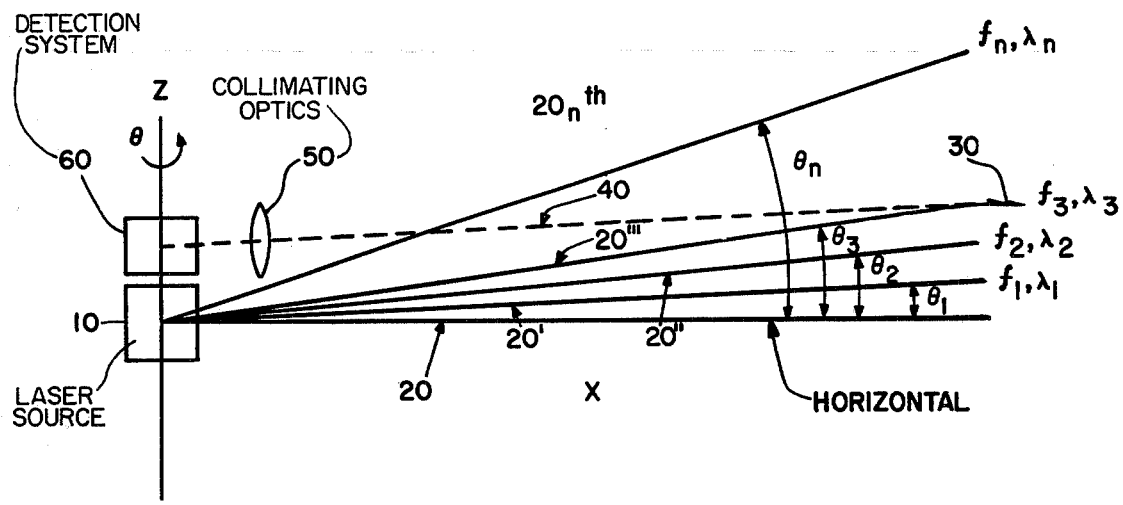
FIG. 1 is a schematic block diagram of the system.

FIG. 1 is a schematic block diagram of a system wherein 10 is a continously tunable laser source which in the present application is an organic dye laser which is capable of continous tuning across a predetermined frequency bandwidth. The tuning may be accomplished acousto-optically, electro-optically or as is set forth in the co-pending application Ser. No. 287,112. The frequency scanned output of the laser source is directed onto a dispersive element, not shown, which changes the frequency scan into a spatial scan as indicated by the beams 20, 20'', and 20''' . . . 20nth. At specific angles, $(\theta_1, \theta_2 \text{-} \text{-} \text{-}\theta_n)$ measured from the horizontal specific optical frequencies $(f_1, f_2, \text{-}\text{-}\text{-}f_n)$ (wavelengths) are projected into space.

If an object, such as an airplane indicated at 30, is at some elevation angle, say $\theta_3$, and if during the azimuth scan (through $\phi$ about the vertical) the object is illuminated by beam 20''', some of the reflected energy indicated at 40 will be collected by collecting optics 50 and inputted into the laser radiation detecting system 60. The collecting optics 50 could be of any appropriate design and a single lens is shown merely as an example.

The frequency, $f_3$, (wavelength, $\lambda_3$) of the detected signal is determined by the laser radar detection system 60 and the elevation angle $\theta_3$ is determined automatically. As pointed out before, the azimuthal angle $\phi$ is determined by scanning about the vertical and the range to the target is determined by the laser range finder function, neither which forms part of the present invention. That is to say, the details of neither the system for driving the receiver and transmitter about the vertical axis and the associated angle encoders or the laser range finder function are unique to the present invention.

Figure 2:
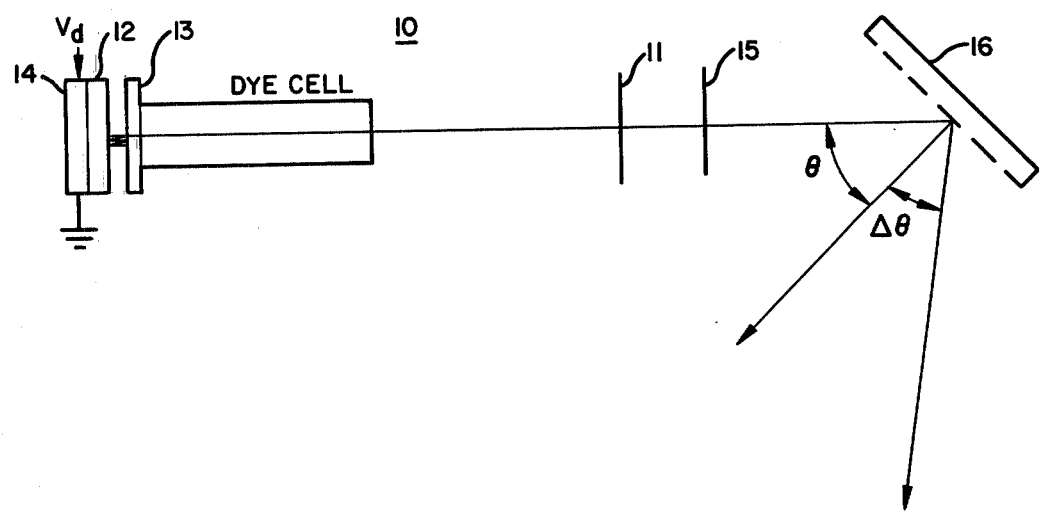
FIG. 2 is a line drawing of the plan view of the transmitting laser system.

The laser transmitting system is set forth in greater detail in FIG. 2 wherein a dye cell is positioned in a laser cavity 10 having an output mirror 11 and 99.6% reflective back mirror 12. Back mirror 12 is actually on the back surface of one of the Fabry-Perot interferometer flats. The other interferometer flat 13 is physically attached to the end of the dye cell. Except for the particular attachment of the Fabry-Perot interferometer to the laser cell, the construction of the laser cavity is exactly the same as that set forth in greater detail in copending U.S. patent application Ser. No. 287,113, filed Sept. 1, 1972 by Richard S. Hughes, now U.S. Pat. No. 3,872,407.

As indicated, the front flat 13 of the interferometer is fused to the back end of the dye cell and actually becomes the back window of the cell. The back flat 12 of the interferometer also serves a dual role. Its rear surface is coated with a dielectric coating to form a 99.6% reflectivity back mirror.

The mirror 12 is attached to a piezo-electric crystal 14 that is driven by a voltage $V_d$. Driving the crystal 14 provides purely translational motion of the flat 12 along the z-axis. The piezo-electric crystal 14 is driven by means of an input $V_d$ applied in a conventional manner thereto.

Figure 3:
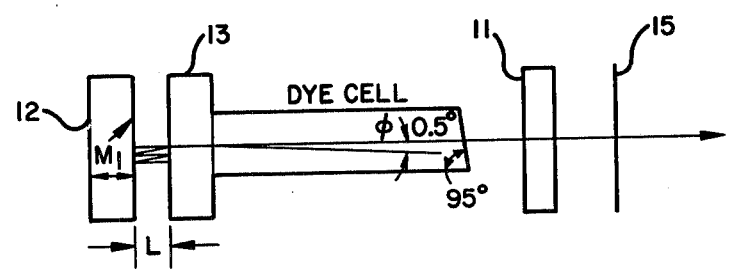
FIG. 3 is a side elevation of the interferometer tuning system.

The interferometer tuning system is set forth in greater detail in FIG. 3. Interferometer flats 12 and 13 are inclined at an angle equal to 0.5 degrees with respect to the optical axis of the cavity in order to assure operation of the interferometer in the transmission mode. The back mirror is inclined at an angle of 0.5 degrees with respect to the flat 12 and 13 so that it forms a high Q optical cavity with output mirror 11. Also, to avoid unwanted spectral resonances, the front window of the dye cell is tilted 5° to be sure it is not parallel to any other optical surface.

The dye cell and front interferometer flat 13 are mounted in a special holder equipped with electromicrometers for precise rotational adjustment of the flat about the x and y axis and precise translational adjustment along the z axis. Fine micrometer adjustments are achieved by applying a voltage to a piezo-electric ceramic in series with the standard micrometers spindle. The above features do not form part of the present invention and therefore are not illustrated. However, the equipment used in the present invention is commercially available.

The remaining portion of the system comprises an iris 15 through which the output laser beam passes before impinging on an extra cavity dispersing element 16. In the present embodiment, the dispersing element is a diffraction grating, however, it is to be understood that any suitable dispersive element might be used, for instance, a prism.

As the output wavelength of the tunable laser is varied, the diffraction angle $\Delta\theta$ is varied and scanning is accomplished. The standard dispersion equation can be inverted to provide the equation describing the scan: $d\theta/d\lambda = (2 \tan \theta)/\lambda$ which for a grating blazed for 500 nm and a blaze angle of 32° 41′ yields: $d\theta/d\lambda = 1°$ of rotation/6.8 nm.

As noted, a refractory (rather than a diffraction) element could be used to provide the scan and the appropriate equation would apply to describe the functional dependence of the scan angle on the wavelength.

The laser radiation detection system is a system which uses polarization and phase retardation techniques to detect and identify laser radiation in a white light background. A unique feature of the system is that it is a staring system i.e., it is continuously sensitive over all portions of its spectral bandwidth from a given volume in space, and it detects monochromatic radiation while rejecting broad spectral sources. It has the capability for high resolution optical frequency (wavelength) measurement and very fast response, while its configuration is relatively simple and compact and incorporates no moving parts, optical filters or dispersing elements.

A complete description of a laser radiation detection system may be found in co-pending U.S. application Ser. No. 375,243. However, a brief discussion of the characteristics and operating principles of the laser radiation detection system is set forth in the following paragraphs.

The operation of the system depends primarily on an optical component called a phase retardation plate, or retarder. In most cases, a retarder is simply a plate which is cut from a single birefringent crystal such as quartz or calcite. A birefringent material is one which exhibits two distinct indices of refraction for orthogonal linear polarizations when light is passed through the material in a certain direction. There are two orthogonal directions in the face of the retarder, called the fast and slow axes, which are associated with the lower and higher index of refraction, respectively.

If a polarized beam of monochromatic light is passed through the retarder at normal incidence, the beam is divided into two orthogonal, linearly polarized components whose directions of polarization lie along the fast and slow axes. Due to the difference of refractive index, one of these components will travel through the crystal faster than the other component. On emerging from the retarder, the components recombine in a new polarization form, which is related to the incident form through the equation:

$$R = J(t/\lambda)$$

where R is a quantity called the retardation, which is a measure of the change of polarization form, J is the birefringence of the retarder material i.e., the difference between the two refractive indices, $\lambda$ is the wavelength of the radiation, and t is the thickness of the retardation plate.

$\lambda$ and t are expressed in the same units of length, J is a pure number, and R is normally expressed either in terms of waves of retardation, or as a phase angle i.e., either degrees or radians. Phase retardation is a cyclic phenomenon. If the incident polarization form is held constant and either the wavelength or plate thickness is varied, the emerging polarization form will change continuously in a regular manner, finally returning to the original polarization form (at which time it is said that the polarization form has changed by one wave of retardation) and repeating the process.

As an example, let it be assumed that a beam of linearly polarized light is incident on a retarder with its direction of polarization making an angle of 45° with the retarder's fast axis. Let it further be assumed that the wavelength, birefringence and thickness are such that the light experiences an integral number of waves of retardation. The light would thus emerge linearly polarized with its direction of polarization at 45° to the fast axis.

If the wavelength of the light is slowly increased, the emerging light becomes elliptically polarized, with the long symmetry axis parallel to the incident polarization direction. The handedness of the polarization depends on whether the incident polarization made an angle of + or −45° with the retarder's axis. As the wavelength continues to increase, the light becomes more and more circularly polarized, passes through a circularly polarized state, becomes elliptically polarized with the long symmetry axis perpendicular to the incident polarization direction, and finally becomes linearly polarized at 90° to the incident direction.

Figure 4:
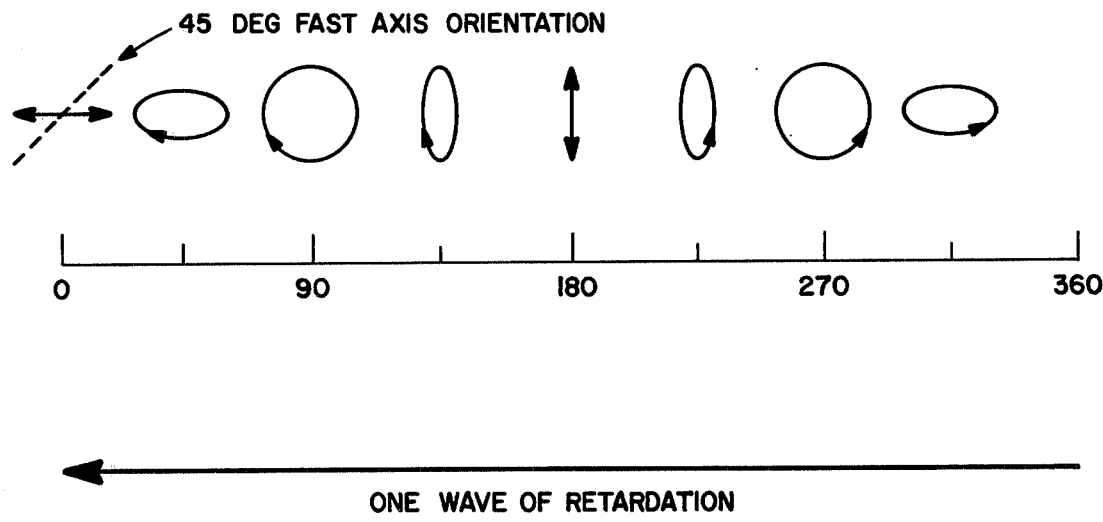
FIG. 4 is a graph showing polarization forms.

If the wavelength is further increased, the same process of elliptical-circular-elliptical-linear polarization is observed (only this time with the opposite handedness) until the original polarization form is regained. This process is illustrated in FIG. 4.

Figure 5:
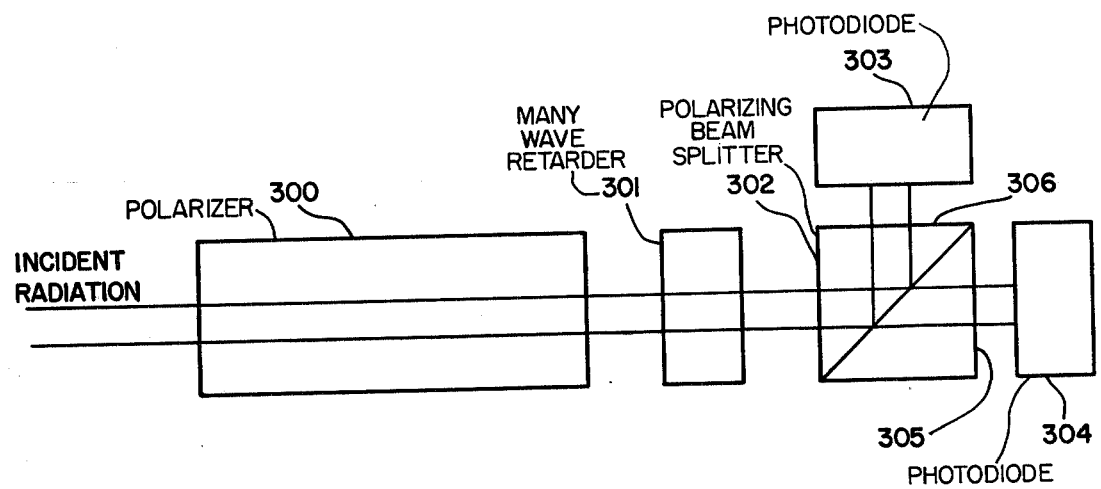
FIG. 5 is a basic laser radar detection system configuration.

A basic laser radiation detection system configuration is set forth in FIG. 5 wherein a polarizer 300, many wave retarder 301, polarizing beam splitter 302 and photodiodes 303 and 304 are illustrated. Incident light is polarized by the polarizer 300 and impinges on the many wave retarder 301. The retarder linearly polarizes the light at 45° to the retarder's fast axis. Since the retarder thickness is fixed, the emerging polarization form depends only on the wavelength of the light. For a monochromatic beam, the emerging light will all be polarized in the same form, while for light with a broad spectral band, there will be a continuum of polarization forms. The rapidity with which the polarization forms change with wavelengths depends on the thickness of the retarder 301.

The light is next passed through a beamsplitting polarizer 302 which divides the light into orthogonal linear polarization components and directs and deflect the components through first and second exit windows 305 and 306 respectively. These separated components are then sensed by a pair of matched silicon photodiodes 303 and 304, whose outputs are fed to a differential amplifier, not shown in FIG. 5.

If the retarder is of sufficient thickness (typically a few millimeters for a quartz retarder), broad band light will experience many waves of retardation across its spectral bandwidth and the integrated orthogonal components will be equal. Thus, no output would be expected from the differential amplifier for a broad spectral source. An output signal would be expected however, for a monochromatic light source, since the orthogonal components are generally not equal. The amplitude of the signal would not be constant for all wavelengths and would pass through zero as the polarization form became circular.

Provision must therefore be made for sensing monochromatic light when the form emerging from the retarder 301 is circular. In the laser radiation detection sensor set forth in the co-pending U.S. patent application Ser. No. 375,245, this was accomplished by building a second train of elements with an achromatic quarter-wave retarder inserted between the retarder 301 and the polarizing beamsplitter 302 in FIG. 5.

The second channel thus measures the amount of circular polarization present in the light emerging from the retarder while the first channel measures the amount of linear polarization. An analysis has shown that the outputs from the differential amplifiers are proportional to the C and S components of the Stokes vector characterization of a polarized light beam. These values may be expressed as:

$$C = K \cos(2\pi J \frac{t}{\lambda}) \text{ and}$$
$$S = K \sin(2\pi J \frac{t}{\lambda})$$

where K is simply a proportionality constant.

In order to measure wavelengths with the laser radar detection system, it is necessary to use several channels with retarders of different thicknesses. Several configurations are possible, and it is not necessary to describe all of them for the purposes of the present invention. As set forth previously, one configuration involves a two channel system, each with a different retarder thickness. This again is set forth in the co-pending U.S. patent application Ser. No. 375,243.

Figure 6:
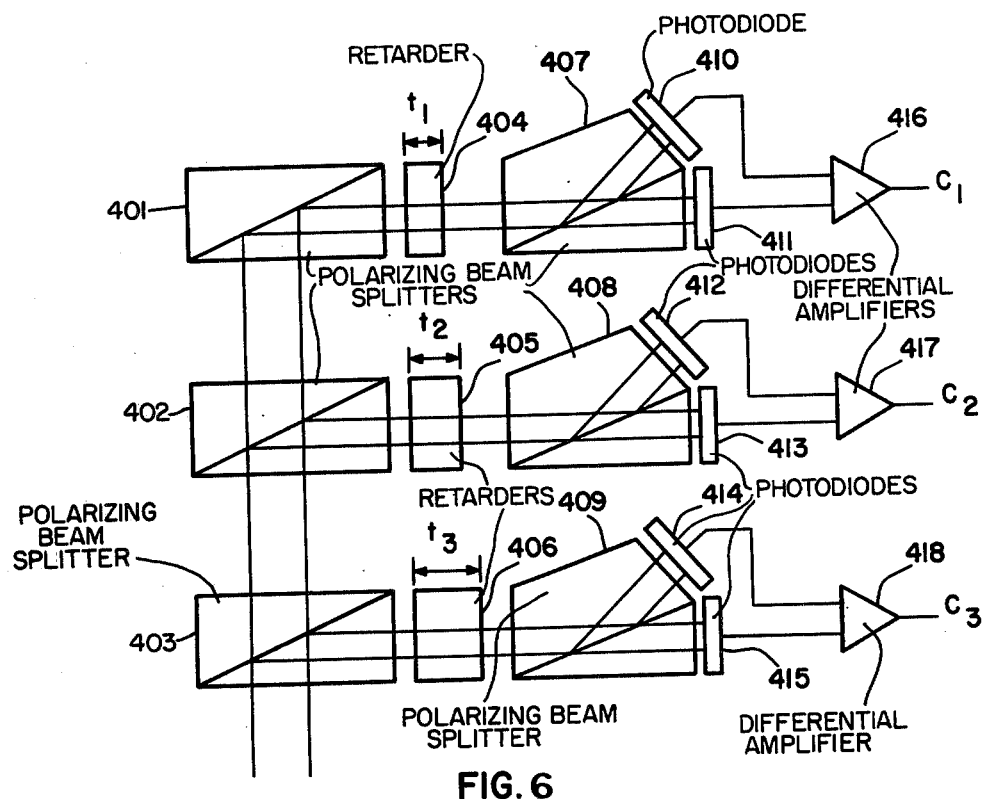
FIG. 6 is a three-channel laser radiation detector system configuration.

A more simple configuration is set forth in FIG. 6 and comprises a three channel laser radiation detection system. In this system, the thickness difference between the retarders of the first and second channels is the same as the thickness difference between the retarders of the second and third channels. Thus in FIG. 6 there are three beam splitting polarizers 401, 402, and 403 associated with retarders 404, 405, and 406 respectively. The outputs of the respective retarders impinge on polarizing beamsplitters 407, 408 and 409. Each of the beamsplitters in turn has associated therewith a pair of photodiodes, for instance, photodiodes 410, 411 with beamsplitter 407; photodiodes 412 and 413 with beamsplitter 408; and photodiodes 414 and 415 with beamsplitter 409. The outputs of the respective pairs of photodiodes are inputted to differential amplifiers 416, 417 and 418 providing outputs $C_1$ $C_2$ and $C_3$ from the respective differential amplifiers.

The wavelength equation for this configuration is $$\lambda = \frac{2\pi J \Delta t}{\cos^{-1} \frac{C_3 + C_1}{C_2}}$$

where $C_1$, $C_2$ and $C_3$ are the outputs from the three differential amplifiers 416, 417 and 418 respectively and $\Delta t$ is the difference in retarder thickness between the first and second, and second and third channels. The need for a quarter-wave retarder in this configuration is eliminated because the null points do not occur at the same wavelengths for the different channels therefore, there is always some signal.

The wavelength resolution of the laser radiation detection system is determined mainly by the amount of error in the associated electronics and by the width of the spectral band which must be sensed. The laser radiation detection system is well suited for use in conjunction with a continously rapidly tuneable dye laser in an optical radar system.

Some of the advantages of the system are; increased accuracy with which an object can be located in space and ability to operate very close to the horizon without clutter due to the highly collimated nature of the laser beam. Another advantage of the laser radiation detection system in and of itself over other approaches is that it could be designed for greater wavelength resolution with less complexity and cost than could be had with, for example, detector arrays. Furthermore, there is no need to scan the laser radiation detection system in elevation. Thus, there are no moving parts in either the laser source or the sensor other than the mounting which could be rotated in azimuth. Also, the sensitivity of the laser radiation detection system can be substantially increased by designing it with a specific application in mind. For example, by controlling the polarization form of the illuminating radiation, optical losses at the first polarizer could be minimized; knowledge of the pulse repetion rate allows interpulse blanking, with a resultant increase in signal to noise ratio; and a reduced spectral sensitivity range (on the order of a few hundred angstroms or less) would allow one to spectrally filter background radiation, while at the same time increasing the wavelength measurement resolution greatly.

What is claimed is:

1. A frequency agile optical radar system comprising;
   a frequency agile source of coherent radiation;
   tuning means associated with said source for changing the frequency and corresponding wavelength of said source in a continuous manner;
   fixed scanning means associated with said source such that the output of said source impinges on said scanning means;
   said scanning means being operable to deflect said output in at least one plane at an angle dependent on the output frequency and corresponding wavelength λ of said source;
   receiving means in said system for receiving reflected transmitted radiation from an object in space;
   said receiving means including a fixed coherent radiation detecting means;
   said coherent radiation detecting means being operative to determine the wavelength λ of detected reflected radiation from said object in space and thereby the angle to the object corresponding to that particular λ.

2. A frequency agile optical radar system as set forth in claim 1 wherein;
said source of coherent radiation comprises a continously tunable laser.

3. A frequency agile optical radar system as set forth in claim 1 wherein;
said source of coherent radiation comprises a continously tunable dye laser.

4. A frequency agile optical radar system as set forth in claim 2 wherein;
said scanning means is operable to deflect said output in the azimuth plane at an angle dependent upon the output frequency and corresponding wavelength λ of the continously tunable laser.

5. A frequency agile optical radar system as set forth in claim 1 wherein;
said fixed scanning means is rotatable in azimuth;
and including means for rotating said fixed scanning means in azimuth.

6. A frequency agile optical radar system as set forth in claim 1 wherein;
said frequency agile source of coherent radiation and said receiving means are rotatable in azimuth but fixed with respect to elevation.

7. A frequency agile optical radar system as set forth in claim 1 wherein;
said receiving means comprises a laser radiation sensor including at least one polarizer means situated in the return reflected optical path for plane polarizing light rays traveling along said optical path;
a many wave retarder situated in said path for dividing the plane polarized light ray from said polarizer means into two orthogonally polarized components to form a change in polarization of the light rays;
a polarizing beam splitter situated in said path;
said retarder being located between said polarizer and said beam splitter and;
a pair of photo diodes situated in the paths resulting from said beam splitter.

8. A frequency agile optical radar system as set forth in claim 1 wherein;
said receiving means includes a fixed coherent radiation detecting means;
said radiation detecting means including beam splitting means for separating the incident radiation thereon into at least three paths;
each one of said paths including a polarizer for polarizing a beam incident thereon;
a retarder for operating on and affecting the polarization of radiation incident thereon;
a polarizing beam splitter which splits the incoming incident beam thereon into at least two paths and additionally affects the polarization of the incident beam;
a photo diode associated with each of said at least two paths and a differential amplifier connected to the outputs of the photo diodes to receive the outputs therefrom;
each of said retarders associated with said at least three paths being of different thicknesses;
so that wavelength and corresponding unique angle to an object in space are determined in accordance with $$\lambda = \frac{2 \pi J \Delta t}{\cos^{-1} \frac{C_3 + C_1}{C_2}}$$

where J is the birefringence of the retarder materials, t is the difference in retarder thickness between the first and second, and second and third channels, and $C_1, C_2$ and $C_3$ are the outputs of the three differential amplifiers.

* * * * *